Aug. 15, 1967  R. W. CLINE  3,335,624
APPARATUS FOR MAKING A GROOVED RING SEAL
Filed May 7, 1965  4 Sheets-Sheet 1
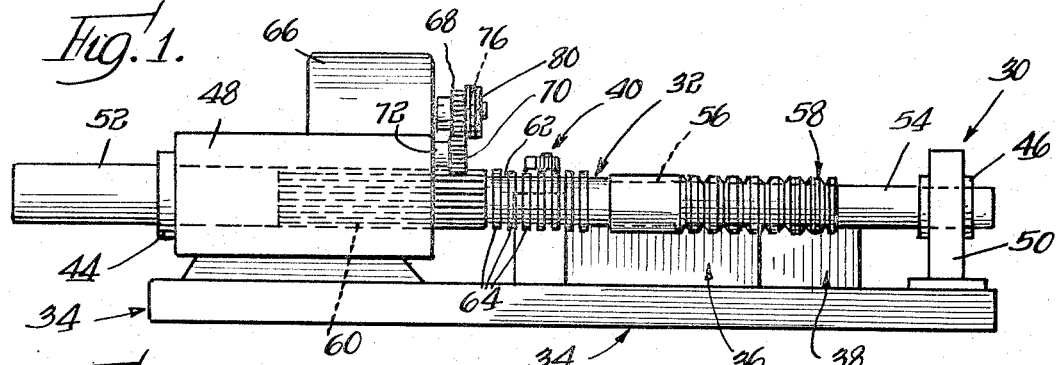
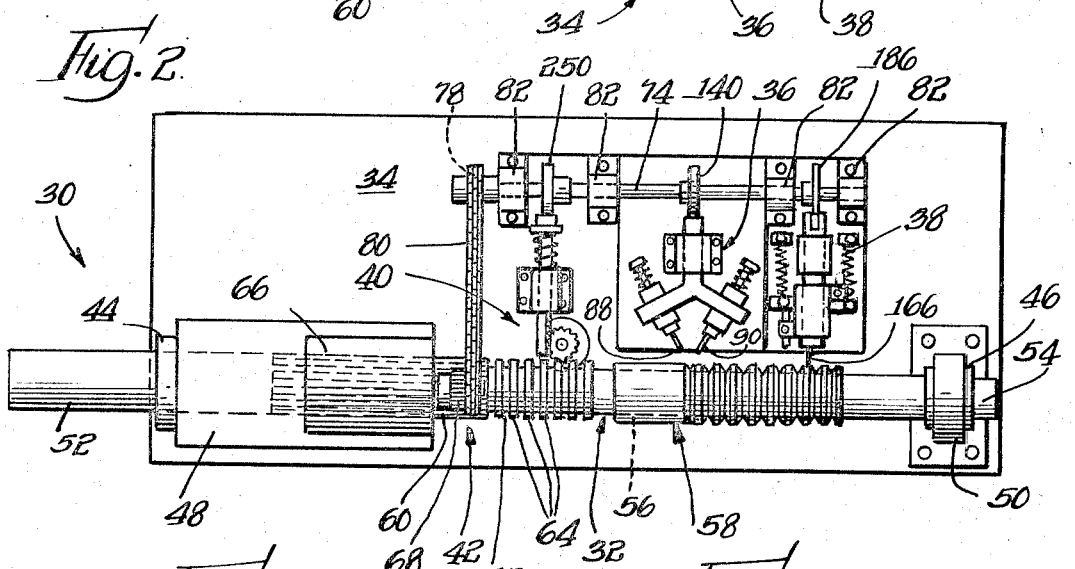
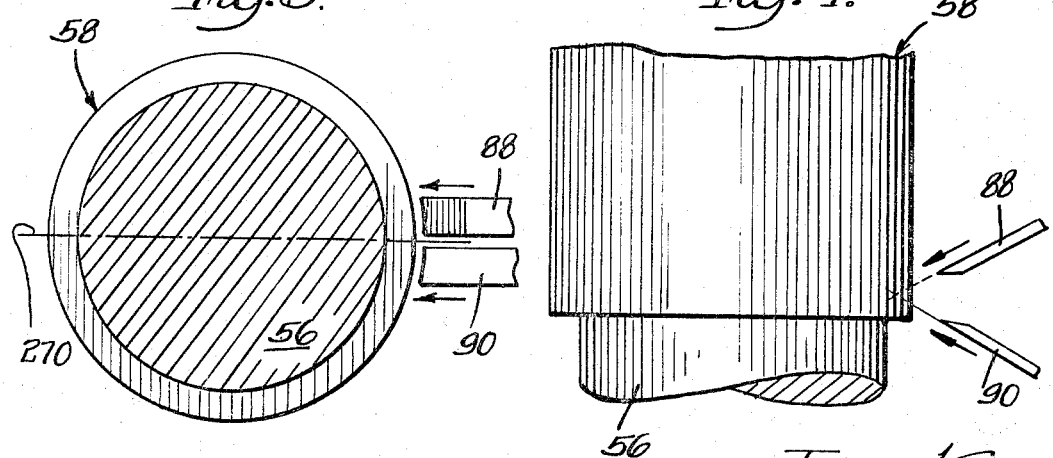
Inventor
Robert W. Cline
By: Olson, Trexler, Wolters & Bushnell
Attys.

Aug. 15, 1967    R. W. CLINE    3,335,624
APPARATUS FOR MAKING A GROOVED RING SEAL
Filed May 7, 1965    4 Sheets-Sheet 2
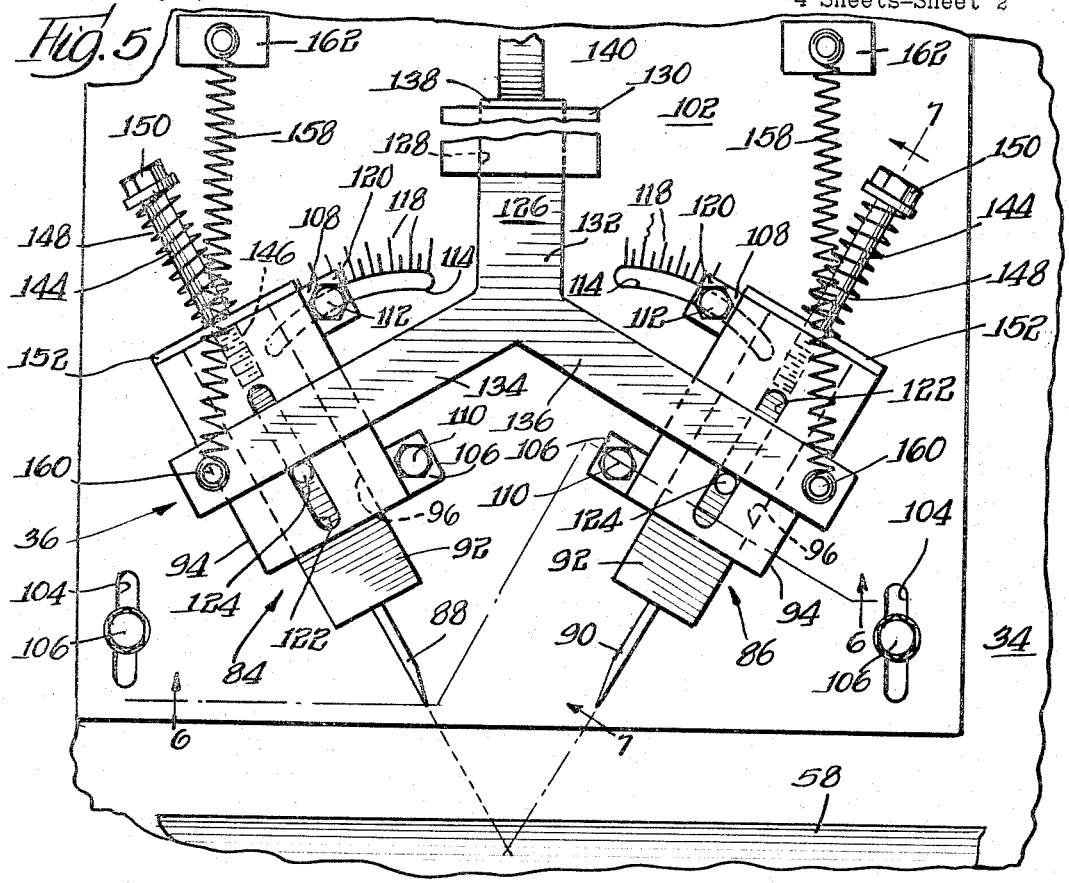
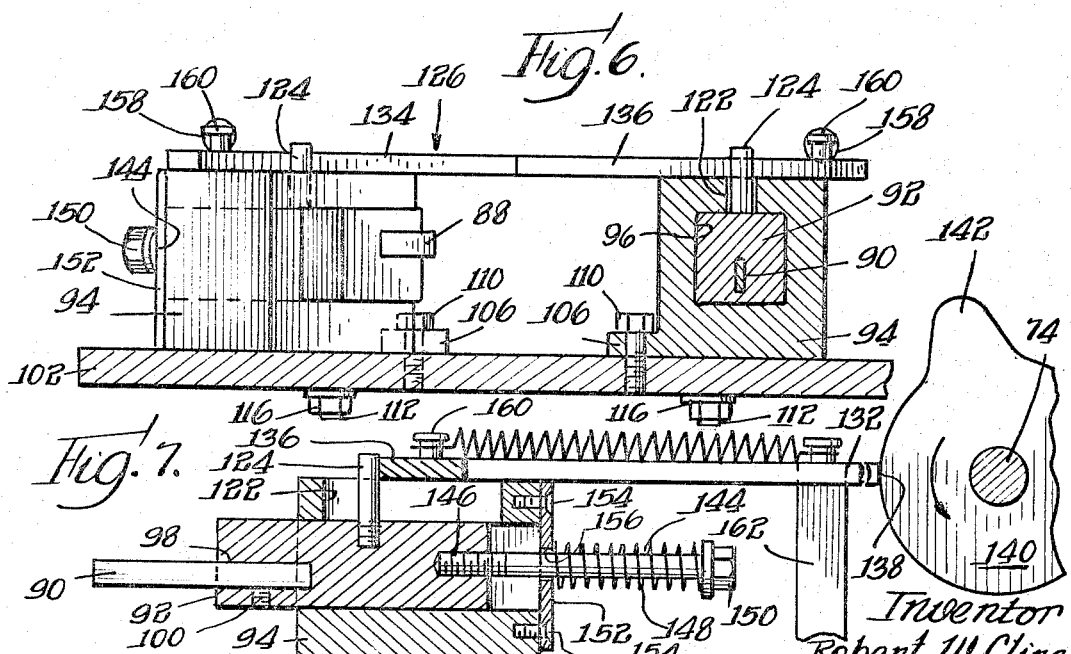
Inventor
Robert W. Cline
By Olson, Trexler, Wolters & Bushnell
attys.

Aug. 15, 1967  R. W. CLINE  3,335,624
APPARATUS FOR MAKING A GROOVED RING SEAL
Filed May 7, 1965  4 Sheets-Sheet 3
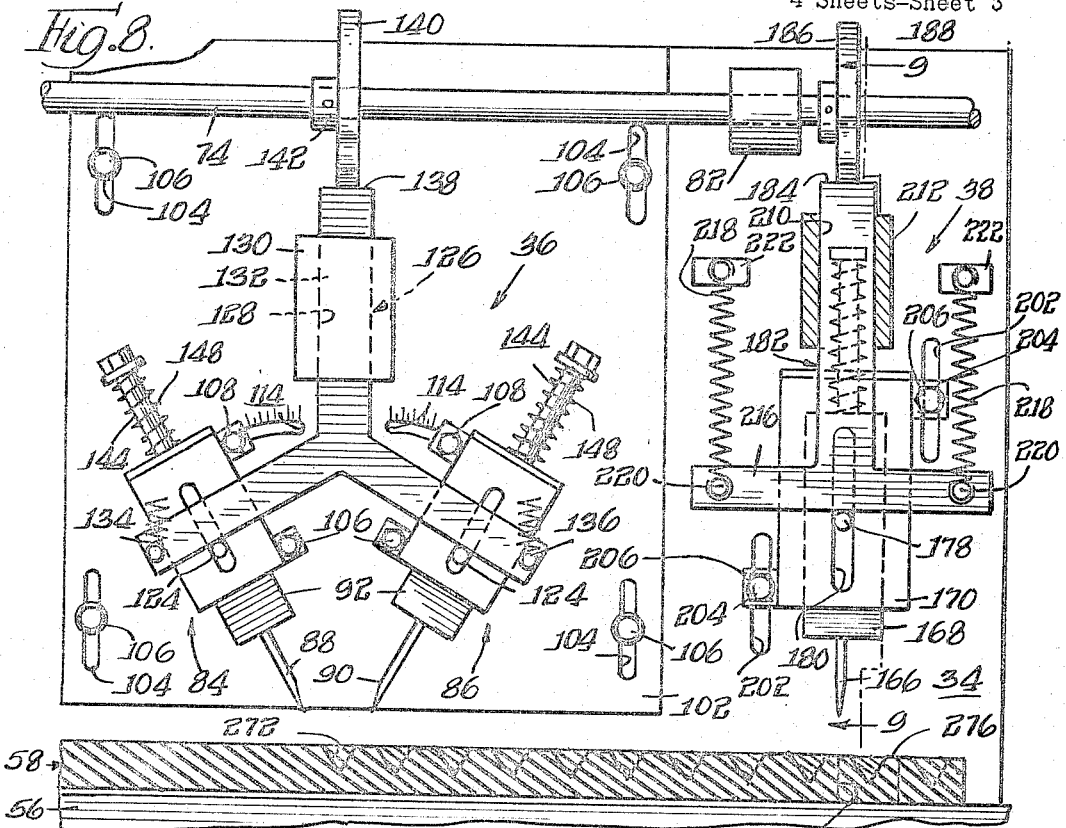
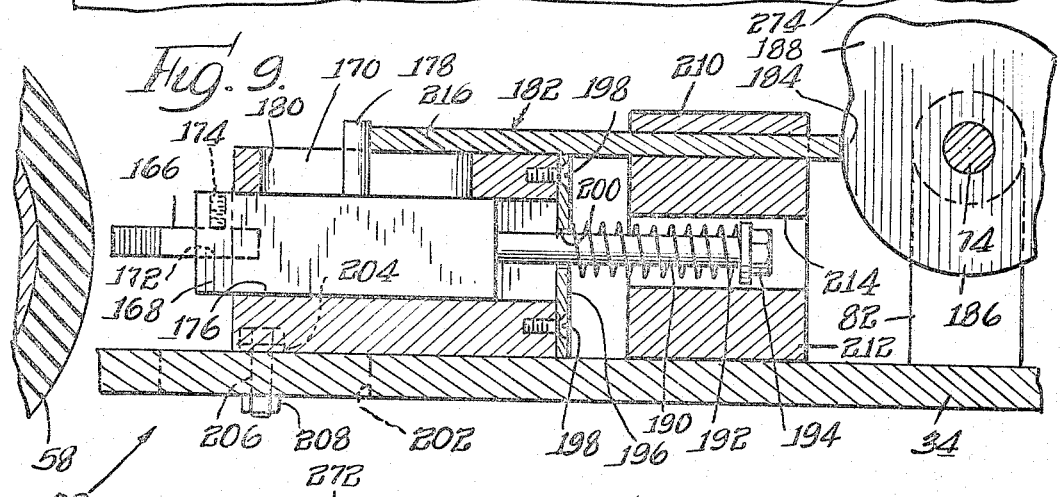
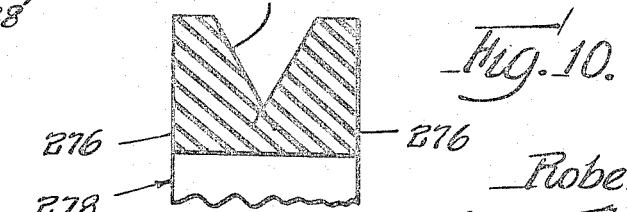
Inventor
Robert W. Cline
By Olson, Trexler, Wolters & Bushnell
Attys Aug. 15, 1967 — R. W. CLINE — 3,335,624
APPARATUS FOR MAKING A GROOVED RING SEAL
Filed May 7, 1965 — 4 Sheets-Sheet 4
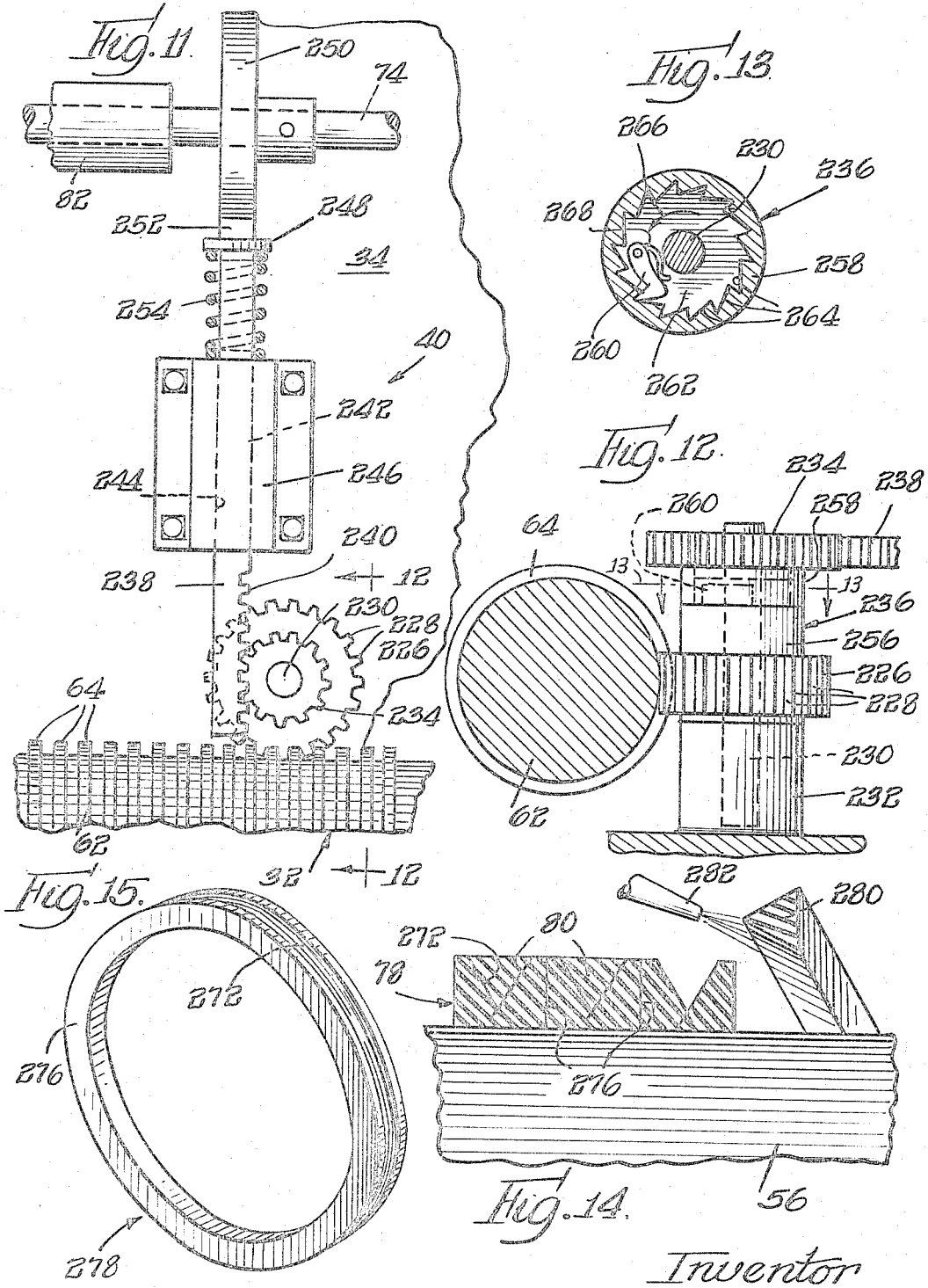
Inventor
Robert W. Cline
By: Olson, Trexler, Wolters & Bushnell
Attys.

United States Patent Office 3,335,624
Patented Aug. 15, 1967

3,335,624
APPARATUS FOR MAKING A GROOVED RING SEAL
Robert W. Cline, New Paris, Ind., assignor to Goshen Rubber Co., Inc., Goshen, Ind., a corporation of Indiana
Filed May 7, 1965, Ser. No. 454,136
15 Claims. (Cl. 82—2)

This invention relates generally to machines for making rubber sealing rings and more particularly to machines for making sealing rings having an external groove.

Rubber sealing rings having a radially outwardly opening groove or channel are more advantageous than sealing rings without such a groove or channel in that their greater flexibility permits of a gently wiping rather than an aggressively rubbing type of sealing action. However, these grooved or channeled seals have heretofore been fabricated by relatively expensive molding operations. Furthermore, attempts at making a grooved style of sealing ring have, in the past, been unsuccessful because of jamming of the cutters in the stock material.

Therefore, a general object of the present invention is to provide new and improved apparatus for making rubber sealing rings.

Another object of the invention is to provide apparatus for cutting grooves in a rubber element easily and unhindered by any appreciable binding.

Still another object of the invention is to provide apparatus for making rubber sealing rings in a rapid, coordinated manner.

A further object of the invention is to provide ring seal manufacturing apparatus that is capable of being regulated to make different styles of externally grooved seals.

These and other objects and features of the invention will become more apparent from a consideration of the following descriptions.

Apparatus in accord with the invention includes a rotatable support having a formation adapted to receive a rubber sleeve thereon, a cutter base aligned radially of the support adjacent its sleeve-receiving formation, and a pair of cutters mounted on the base to execute reversibly convergible movements toward the sleeve-receiving formation for cutting a groove in the sleeve. In addition, a third cutter is mounted on the base to execute reversible movements toward the sleeve-receiving formation for making a sidewall cutoff in the sleeve, motive means being provided for cyclically advancing the three cutters in a selected pattern of operation. Furthermore, an indexing arrangement is included for causing incremental advance of the support relative to the cutter base whereby to permit repeated incising of the sleeve for producing a plurality of grooved sealing rings therefrom.

The invention, both to its structure and its mode of operation, will be better understood by reference to the following disclosure and drawings forming a part thereof, wherein:

FIG. 1 is a side elevational view of apparatus constructed in compliance with the principles of the invention for use in making rubber sealing rings;

FIG. 2 is a top plan view of the apparatus of FIG. 1;

FIG. 3 is an enlarged, schematic view showing the rubber sleeve and the formation which receives it, together with the convergible cutters, the figure particularly illustrating the arrangement of the grooving cutters which precludes binding of the sleeve stock material therebetween;

FIG. 4 is a top plan view showing the arrangement of FIG. 3;

FIG. 5 is an enlarged plan view showing the grooving cutters and their arrangement for adjustable relocation;

FIG. 6 is an elevational view taken substantially along the lines 6—6 of FIG. 5;

FIG. 7 is an elevational view taken substantially along the line 7—7 of FIG. 5, showing the details of an individual cutter and its associated structure;

FIG. 8 is an intermediate scale plan view showing the cutter unit of FIG. 5 and its relation to the sidewall cutoff unit, certain parts having been removed for clarity of illustration;

FIG. 9 is an enlarged, sectional view taken substantially along the line 9—9 of FIG. 8;

FIG. 10 is an enlarged, fragmentary view taken in cross-section through a ring seal fabricated in compliance with the invention and showing the V groove cut therein;

FIG. 11 is an enlarged, top view of the indexing drive that is employed in the machine of FIG. 1 for advancing the sleeve-receiving formation in an incremental manner;

FIG. 12 is an enlarged, elevational view taken substantially along the line 12—12 of FIG. 11;

FIG. 13 is a sectional view taken substantially along the line 13—13 of FIG. 12 to show the details of the overriding clutch which is used to transmit unidirectional power in the indexing drive;

FIG. 14 is an enlarged, schematic view illustrating removal of the scrap cut from the rubber sleeve in the seal-manufacturing operation of the machine of FIG. 1; and FIG. 15 is a perspective view of a completed ring seal.

Referring now in detail to the drawings, specifically to FIGS. 1 and 2, apparatus for making rubber sealing rings is there indicated generally by the reference numeral 30. The apparatus 30 broadly comprises a rotatable support 32, a machine bed 34, a grooving cutter unit 36, a sidewall cutoff unit 38, an indexing drive 40 for causing incremental advance of the support 32, and a power source 42 for delivering rotative energy to the support 32 and operating force to indexing drive 40, grooving cutter unit 36, and sidewall cutoff unit 38.

The rotatable support 32 constitutes an elongated work shaft which is mounted for both rotation and axial translation in spaced journals 44 and 46, journal 44 being affixed in a tunnel housing 48 and journal 46 being secured in an upright standard 50 which is fastened to the machine bed 34. The shaft-type support 32 is provided with smooth-walled cylindrical end portions 52 and 54 for coaction with the journals 44 and 46 respectively. The support 32 is additionally provided with a medial formation 56 which is adapted to receive a rubber sleeve 58 and retain the same in position on the support 32. For example, the medial formation 56 may be of slightly greater diameter than the cylindrical end portion 54 so that the sleeve 58 may be readily slipped over the end portion 54 and more snugly assembled to the formation 56. Furthermore, the medial formation 56 may be provided with split-ring collars at its opposite ends for use in retaining the sleeve 58 in position, and the formation 56 may even be separable from the remainder of the rotatable support 32. In addition to the medial formation 56, the support 32 includes an externally splined section 60 and a central section 62 having annular ribs or teeth 64 raised from its surface. The annular teeth 64 are advantageously spaced apart by a uniform distance which is correlated with the width of the sealing rings which are to be cut from the sleeve 58.

The power source 42 includes a suitably energized motor 66 which is attached to the tunnel housing 48. In order to transmit rotative force from the motor 66 to the externally splined section 60 of the rotatable support 32, a spur gear 68 is mounted on the output shaft of motor 66 to mesh with an idler gear 70 which, in turn, meshes with the externally splined section 60, idler gear 70 being supported for free rotation on a stub shaft 72 which is affixed to the tunnel housing 48. With particular reference to FIG. 2, a rotative force is also desirably transmitted from the motor 66 to a camshaft 74 from which cutter unit 36, cutoff unit 38 and indexing drive 40 are operated. For this purpose, a sprocket wheel 76 is secured to the output shaft of motor 66 adjacent the spur gear 68. Co-operatively, a sprocket wheel 78 is fastened to the camshaft 74, and an endless chain 80 is threaded over the sprocket wheels 76 and 78 in power-transmitting relationship therewith. Gear drives and chain drives are employed in delivering force from the power source 42 in order to establish positive mechanical interconnection and coordination of the various mechanical movements performed by the apparatus 30. Because of its appreciable length, the camshaft 74 is advantageously supported by a plurality of journal blocks 82 which are disposed at suitable intervals along its length. These journal blocks, as well as the tunnel housing 48 are fastened onto the machine bed 34 in a suitable manner.

The grooving cutter unit

It is apparent from an inspection of FIG. 2 that the machine bed 34 defines a cutter base means disposed generally radially or laterally of the rotatable support 32 in the approximate vicinity of the medial formation 56 which is adapted to receive sleeve or workpiece 58; and turning to a consideration of FIGS. 5–7 for a more detailed description of the grooving cutter unit 36 which is mounted on this cutter base, the unit 36 is shown as including a pair of cutter arrangements 84 and 86 which are fashioned and assembled to execute reversibly convergible, cutting movements toward and away from the medial formation 56 of the rotatable support 32. The arrangements 84 and 86 are configured to cut a V groove in the sleeve 58. Each of the cutter arrangements 84 and 86 includes a knife or cutting element, indicated by the reference numerals 88 and 90 respectively, additionally including a carrier member 92 and a guide block member 94. The guide block members 94 are horizontally apertured to receive the carrier members 92 slidably and to direct reciprocating movements of the carrier members, the guide block members 94 having guideways 96 of rectangular section and the carrier members 92 being provided in a complemental cross-section to be directed in straight line movement by their longitudinally slidably fitting engagement in the respective guideways. The knives 88 and 90 are loosely received in slots 98 that are fashioned in the respective carrier members; and as is well shown in FIG. 7, a set screw 100 is usefully employed in securing each knife in its respective slot 98.

In compliance with an important feature of the invention, means are provided for adjustably positioning the cutter arrangements 84 and 86 relative to the machine bed 34 in order to accommodate relative straight line and pivotal types of relocation. Continuing with reference to FIGS. 5–7, the guide block members 94 are seen to be slidably disposed on a plate or platform member 102. As is illustrated in FIGS. 5 and 8, the platform member 102 is perforated with elongated slots 104, the longitudinal axes of which are individually aligned in planes drawn normal to the common central axis of formation 56 and sleeve 58. These slots are provided in a sufficient number and in an appropriate pattern to permit straight line sliding movement of the platform member relative to the machine bed, while, at the same time, preventing relative rotation of the platform member. Four rectangularly spaced slots 104 are illustrated in FIG. 8 as one example of an arrangement satisfying this requirement. Machine screws 106 are passed slidably through the slots 104 and into threaded engagement with the machine bed 34, the shanks of screw 106 cooperating with the sidewalls of slots 104 in guiding the desired relocations of the platform member 102 and the heads of the machine screws 106 being employed as abutments for frictionally clamping the platform member in a selected position on the machine bed.

The pivotal type of relocation of the cutter arrangements 84 and 86 is, in the illustrated embodiment, provided by means of a system of pivots, arcuate guide slots and cooperating lock bolts. With reference to FIGS. 5 and 6, each of the guide block members 94 is shown fashioned with a pair of horizontally spaced, apertured ears 106 and 108 which extend laterally outwardly at the base line of the respective guide block member in contact with the upper surface of platform member 102. Machine screws 110 pass slidably through holes in the ears 106 to engage the platform member 102 threadedly whereby to define pivots for the respective guide block members. In order to provide guide and positioning means, machine screws 112 pass slidably through holes in the ears 108 and slidably through arcuate slots 114 that are fashioned in platform member 102. The lower ends of screws 112 receive lock nuts 116 thereon, as is best shown in FIG. 6. Desirably, angular indicia 118 are scribed or otherwise provided on the platform member 102 adjacent the arcuate slots 114 in order to cooperate with an indicating surface 120 created on each ear 108 for use in determining the angular positions of the guide block members 104. It is to be observed that the surfaces 120 are fashioned to radiate from the central axis of the pivots which are defined by machine screws 110. Lock nuts 116 preserve the assembled condition of the screws 112 and, when tightened, act to fix selected position of the guide block members 94. It is recognized that the platform member 102 may be divided into lateral sections and these sections mounted on the machine bed 34 for individual arcuate relocation in order to achieve angular repositioning of the guide block members 94 borne thereon. This latter arrangement can replace the described arrangement for producing pivotal action of the guide block members; and hence, the word "pivotal" as used herein with reference to the mounting systems for the cutter elements is intended to encompass the latter described arrangement and all other functionally equivalent schemes.

In compliance with another important feature of the invention, means are provided for causing cyclical advance of the carrier members 92 and the knives mounted thereon. More specifically, a longitudinally extending guideway 122 is opened through the roof of each guide block member 94, and a follower post 124 is threaded into or otherwise fixedly mounted to the corresponding carrier member 92 to ride against the walls of guideway 122 and to extend above the surface of the corresponding guide block member to act as a drive element. It is recognized that the posts 124 may be fabricated from antifriction material or lubricated whereby to facilitate their coaction with the sidewalls of guideway 122. In order to advance the posts 124 in the general direction toward the workpiece or sleeve 58, which direction is established by the guideways 122, an actuator member 126 is reciprocably guided by being slidably mounted in a longitudinal slot 128 that is fashioned in a guide block member 130. For coordinating mechanically the cyclical advance of knives 88 and 90, the actuator member 126 is Y-shaped so as to have a main stem portion 132 which merges with diverging arm portions 134 and 136, each of these arm portions being extended to contact one of the posts 124 rearwardly thereof. The rearward surface of the stem portion 132 defines a cam follower surface 138. A cooperating cam 140 is fastened on camshaft 74 in alignment with the axis of stem portion 132, and the cam 140 is provided with an actuating lobe 142, best shown in FIG. 7, this lobe being rotated by the angular movement of camshaft 74 to engage the follower surface 138 periodically. This action advances the actuator member 126 for correspondingly advancing the posts 124 and therefore the knives 88 and 90.

The elements of the grooving cutter unit 36 are normally disposed in a generally retracted condition; and in compliance with the features of the invention, means are provided for biasing the carrier members 92 and the actuator member 126 into such a condition. More particularly, a long-shanked bolt 144 is turned into a cooperatively threaded aperture 146 located in the rearward end of each carrier member 92, the bolt 144 acting as a guide for a compression spring 148. The bolt 144 includes a head 150 which acts as a first spring retainer; and a plate 152 is mounted on the rear of each guide block member 94, using flat headed screws 154 or other suitable fasteners, to act as the confronting spring retainer. The plate 152 is apertured with a hole 156 which is sized to exclude the spring 148 from the interior of guide block 94 while slidably passing the shank of bolt 144. This latter construction is well illustrated in FIG. 7, the identity of the construction of both cutter arrangements 84 and 86 in this regard being shown in FIG. 5. Continuing with reference to FIG. 5, the biasing arrangement for actuator member 126 is shown to include laterally spaced tension springs 158. One end of each spring 158 is mounted on one of arm portions 134 and 136 by means of a post 160. The opposite ends of springs 158 are secured to brackets 162, brackets 162 being attached to the platform member 102 in upstanding relationship. It is recognized that the biasing provided by the springs 148 and 158 may be replaced by a suitable arrangement of cams and followers operated from the camshaft 74 whereby to provide powered actuation of the carriers 92 on both the advancing and retracting portions of their cyclical movements.

The sidewall cutoff unit

Turning now to a consideration of FIGS. 8 and 9 for a description of the sidewall cutoff unit 38, the unit 38 will be seen to comprise a cutter element or knife 166, a carrier member 168 and a guide block member 170. The knife 166 is loosely received in a slot 172 formed in carrier member 168, and a set screw 174 is advantageously employed in fixing the knife in position. The guide block member 170 is channeled with a longitudinally extending recess or guideway 176 which receives the carrier member 168 to direct slidably reciprocating movements thereof. In order to develop the cyclical advancing movements of knife 166, a post 178 is mounted to the carrier member in upstanding relationship to operate in a longitudinally extending slot 180 which opens through the roof of guide block member 170. A T-shaped actuator member 182 is mounted for engagement with the post 178, and actuator member 182 is fashioned with a terminal surface 184 that act as a cam follower. Cooperatively, a cam 186 is affixed to camshaft 74 and is provided with a lobe 188 which periodically engages the follower surface 184 in order to advance the knife 166 through engagement of the actuator member and the post 178.

Like the carrier members 92 in cutter arrangements 84 and 86, the carrier member 168 is biased into its retracted condition as a normal position. For this purpose, a bolt 190 is threaded into an appropriately formed aperture in the rear of carrier member 168 to receive a compression spring 192 about its shank portion, the bolt 190 including a head 194 that acts as one spring retainer. A plate 196 is mounted to the rear of guide block member 170 by flat headed screws 198 to define the confronting spring retainer. Plate 196 is apertured with the hole 200 which excludes the spring 192 while slidably admitting the shank of bolt 190.

The sidewall cutoff unit 38 is also arranged for adjustable positioning of the cutting element or knife 166; and with reference to FIG. 8, the machine bed 34 will be seen provided with elongated slots 202 which extend parallel with the slots 104 in generally lateral alignment of the sleeve 58 and medial formation 56. Cooperatively, the guide block member 170 includes laterally projecting ears 204 which extend over the slots 202, the ears 204 being perforated with apertures which freely pass the shanks of guide bolts 206 into the slots 202. Nuts 208 are turned over the free ends of bolts 206 to retain them in place, as is illustrated in FIG. 9. It is to be recognized that the nuts 208 may be loosened to permit straight line relocation of the guide block 170 laterally of the formation 56.

The advancing and retracting movements of actuator member 182 are directed by a guideway 210 that is fashioned in a guide block 212 as is shown in FIG. 8. In addition to the guideway 210, the guide block 212 is provided with a recess 214 to admit the cantilevered end of bolt 190, as is shown in FIG. 9. The guide block 212 is advantageously spaced rearwardly of the center of gravity of actuator member 182 when the forward end of that member rides on the upper surface of guide block 170 in compliance with the showing of FIG. 9.

The actuator member 182 includes a cross-bar portion 216, the distal ends of which establish mounting sites for tension springs 218. The tension springs 218 act to bias the actuator member 182 into a retracted position and are specifically attached between posts 220 which are raised from the cross-bar portion 216 and a pair of brackets 222 which are fastened to the machine bed 34 in upstanding relationship.

Drive arrangement for workpiece support

The means for causing incremental advance of the rotatable support 32 relative to the machine bed 34 will now be described with reference to FIGS. 11–13. In FIG. 11, the indexing drive 40 comprises an indexing wheel 226 which is provided with gear teeth 228, gear teeth 228 meshing with the annular teeth 64 that are raised from the surface of the central section 62 of rotatable support 32. The indexing wheel 226 is assembled with a vertical shaft 230, and shaft 230 is journaled in a bearing block 232, as is shown in FIG. 12, journal block 232 providing appropriate reaction to both radial and thrust forces. In addition, a spur gear 234 is mounted on shaft 230 spaced vertically above the indexing wheel 226, spur gear 234 being freely rotatable on the shaft 230 and being interconnected with the indexing wheel 226 by means of an overriding or one-way clutch 236.

In order to transmit rotative force to the spur gear 234, the indexing drive 40 includes a rack element 238 which is provided with teeth 240, teeth 240 being spaced appropriately for meshed engagement with the spur gear 234. The rack element 238 is fashioned with an elongate stem portion 242 which is slidably received in an appropriately shaped guideway 244. The guideway 244 is developed in a guide block member 246, and the guide block 246 is bolted or otherwise suitably mounted on the machine bed 34. The end of rack element 238 that is opposite the teeth 240 is provided with a head 248 which acts as a cam follower. Cooperatively, a cam 250 is affixed to camshaft 74 and is fabricated with a lobe 252 for actuating engagement with the follower 248. Since the cam 250 cooperates only slidably with the follower 248, it is advantageous to provide biasing means for urging the follower 248 into regular contact with the surface of cam 250. Accordingly, a compression spring 254 is mounted between guide block member 246 and the radially extending flange defined by the head 248.

Referring to FIG. 12, the overriding or one-way clutch 236 includes a lower cylindrical element 256 and an upper tubular collar element 258. The cylindrical element 256 is attached to the indexing wheel 226 and the collar element 258 is secured to the spur gear 234. With reference to FIG. 13, the clutch 236 additionally includes a ratchet dog 260 which is pivotally mounted to a top surface 262 of lower element 256. Cooperatively, the inner wall of upper collar element 258 is fashioned with a series of teeth 264 which are inclined generally in the direction of driving rotation that is indicated by the arrow 266; and advantageously, a soft spring 268 urges the ratchet dog 260 into engagement with the teeth 264. The one-way clutch 236 transfers rotative force from the spur gear 234 to the indexing wheel 236 on the advance stroke of the rack element 238 but transmits no reversing rotation because the ratchet dog 260 overrides the teeth 264 upon the retraction stroke of the rack element.

The size of the lobe 252 on the cam 250 determines the distance that the rack element 238 advances on its driving stroke. Correspondingly, the number of teeth, the tooth pitch and the diameters of the several gearing elements which transmit force from the rack element to the central section 62 of the rotatable support 32 determine the amount of travel that the movement of the rack element produces in the central section 62. Accordingly, these several factors are arranged to develop an incremental stepping action of the central section, and therefore the entire rotatable support 32, which is appropriate to the development of the desired width in the sealing rings being cut from the sleeve 58.

In compliance with an important feature of the invention, the apparatus 30 is arranged for cutting grooves in the rubber sleeve 58 easily and unhindered by any binding. The ease with which the grooves are cut promotes a rapid, efficient operation. More specifically and with reference to FIGS. 3 and 4, the knives 88 and 90 of the grooving cutter unit are disposed for movement in individual paths located respectively on opposite sides of a plane 270 which is drawn parallel to the longitudinal axis of the sleeve-receiving formation 56. In the specifically illustrated embodiment, the plane 270 is a diametral plane drawn through the formation 56. It is, however, recognized that other planes parallel to the longitudinal axis of formation 56 may be employed so long as the plane selected affords incising engagement of the knives 88 and 90 with sleeve 58. By placing the knives 88 and 90 respectively above and below such a plane, the rubbery material of the sleeve 58 is not squeezed or compressed between these knives as they enter the sleeve; and therefore, binding of the knives in the material of the sleeve is minimized. Moreover, while the knives 88 and 90 are illustrated in FIG. 3 as being spaced apart from the plane 270, it is recognized that the respective bottom and top edges of knives 88 and 90 may be coincident with the plane 270 without developing undesirable binding. The specific mounting of knives 88 and 90 to achieve the positioning illustrated in FIG. 3 can be found in FIG. 6. There, the desired positioning of the knives 88 and 90 is achieved by selecting the relative locations of the slots in the carriers 92 which are intended to receive and carry the knives.

Operation

For purposes of affording a more complete understanding of the invention, it is advantageous now to provide a functional description of the mode in which the component parts cooperate. Assuming that a sleeve 58 has been assembled to the formation 56 of rotatable support 32, assuming that the motor 66 has been energized and is running, and assuming that the momentary position of camshaft 74 is that which is associated with an inactive and withdrawn condition of rack element 238, actuator member 126 and actuator member 182, a sequence of operations will begin with the lobe of cam 140 being rotated into interfering engagement with the follower surface 138 of actuator member 126. As the lobe 142 urges actuator member 126 generally away from the camshaft 74 and toward the sleeve 58, the knives 88 and 90 will be urged into incising relationship with the sleeve; and because the sleeve is being rotated by means of the support 32, as driven by motor 66, intersecting circular incision will be cut in the material of sleeve 58 forming a radially outwardly opening V groove 272 shown in FIG. 8. At about the same time, the lobe of cam 186 will be directed into interfering engagement with the follower surface 184 of actuator member 182 to urge knife 166 into incising engagement with the sleeve 58 forming a sidewall cutoff 274 which penetrates to the root of the sleeve to sever a ring seal 278 from the sleeve 58. It is to be observed that placement of the sidewall cutoff unit 38 processwise subsequent to the grooving cutter unit 36, i.e. in a downstream direction relative to the direction of advance of rotatable support 32, achieves severing of an individual sealing ring from the sleeve after it has received the grooving cut. Such an arrangement is particularly advantageous in achieving uniformity and precision in the cutting of the groove and the making of the sidewall cutoff, and it is recognized that the sidewall cutoff unit may be placed closer to the location of the grooving cut than is shown in FIG. 8, if desired.

As the lobes of cams 140 and 186 rotate out of interference with the cam follower surfaces of the actuator members 126 and 182, these actuator members are released to the action of their return springs 148, 158, 192 and 218, these springs acting thereby to retract the knives 88, 90 and 166 from incising engagement with the sleeve 58. When the knives are in this retracted condition, the lobe 252 of cam 250 will be rotated into interfering engagement with the cam follower surface provided by the head 248 of rack element 238, advancing the rack and indexing or stepping the rotatable support 32 in the general direction running from tunnel housing 48 to journal 46. The rack element of indexing drive 40 is, as has been described hereinabove, arranged to step the rotatable support 32 an appropriate distance along its longitudinal axis to achieve the desired spacing between the sidewall cutoffs 276. The externally splined section 60 of the rotatable support, by its length, preserves its driving engagement with the motor 66. When the lobe 252 passes out of interfering engagement with the rack element 238, the rack element is released to the action of its return spring 254; and through the overriding action of clutch 236, the rack element is withdrawn without reversing the previously achieved, longitudinal advance of the rotatable support. When the rotatable support 32 and therefore the sleeve 58 are in a rest position, they are readied for re-engagement by the knives 88, 90 and 166; and accordingly, the lobes of cams 140 and 186 once again come into interfering engagement with the respective actuator members for repeating the cycle to groove and sever an additional sealing ring from the rubbery sleeve.

A completed sealing ring is illustrated in FIGS. 10 and 15 which clearly show the cut groove 272 and the cut sidewalls 276. One method of removing scrap pieces 280 from the previously cut sealing rings 278 is illustrated in FIG. 14. As is shown in that figure, an air jet from a nozzle 282 is employed in removing the scrap pieces 280 while the sealing rings 278 are still disposed on the sleeve-receiving formation 56.

When it is desired to change the depth or angulation of the sidewalls of groove 272, the locking screws holding the cutter arrangements 84 and 86 will be loosened and an appropriate repositioning made. Similarly, when a sleeve 58 of greater or lesser thickness is to be employed as the workpiece, the sidewall cutoff unit 40 will be appropriately resituated relative to its position on the machine bed 34. If such repositionings of the cutter unit 36 and the cutoff unit 38 so require, the cams 140 and 186 will be replaced by different cams having lobes of an appropriate radial extent.

The specific embodiment herein shown and described is to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. Apparatus for making rubber sealing rings comprising: rotatable support means having a formation adapted to receive a rubber sleeve and to retain the same in position thereon; cutter base means aligned radially of said support means adjacent said formation; first and second cutting means mounted on said base means to execute reversibly convergible movements in the direction of said formation for cutting a groove in said sleeve; third cutting means mounted on said base means to execute reversible movements in the direction of said formation for making a sidewall cutoff in said sleeve; and motive means for cyclically advancing said first, second and third cutting means.

2. Apparatus for making rubber sealing rings comprising: rotatable support means having a formation adapted to receive a rubber sleeve and to retain the same in position thereon; cutter base means aligned radially of said support means adjacent said formation; first and second cutting means mounted on said base means to execute reversibly convergible movements in the direction of said formation for cutting a groove in said sleeve, each of said cutting means including a reciprocable knife, the knives of said first and second cutting means being mounted for movement in individual paths disposed respectively on opposite sides of a plane drawn parallel to the longitudinal axis of said formation whereby said kives cut freely through the material of said sleeve; third cutting means mounted on said base means to execute reversible movements in the direction of said formation for making a sidewall cutoff in said sleeve; and motive means for cyclically advancing said first, second and third cutting means.

3. Apparatus according to claim 2 wherein said plane is a radial plane intersecting said formation.

4. Apparatus for making rubber sealing rings comprising: rotatable support means having a formation adapted to receive a rubber sleeve and to retain the same in position thereon; cutter base means fixed in position radially of said support means adjacent said formation; first and second cutting means mounted on said base means to execute reversibly convergible movements in the direction of said formation for cutting a groove in said sleeve; third cutting means mounted on said base means to execute reversible movements in the direction of said formation for making a sidewall cutoff in said sleeve; motive means for cyclically advancing said first, second and third cutting means; and indexing means for causing incremental advance of said support means relative to said cutter base means whereby to permit repeated incising of said sleeve for producing a plurality of grooved sealing rings therefrom.

5. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means whereby to produce a plurality of grooved sealing rings from said sleeve.

6. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation, including platform means supportably disposed between said first and second cutting means and said base means, first guide means directably mounting said platform means for one of said types of relocation relative to said base means, and second guide means directably mounting said first and second cutting means for the other of said types of relocation relative to said platform means; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, whereby to produce a plurality of grooved sealing rings from said sleeve.

7. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, including a drive member affixed to each of said cutting means, reciprocably guided actuator means engaging said drive members, and cam means operably engaging said actuator means, said cam means including lobe means shaped to urge said third cutting means aggressively toward said formation when said first and second cutting means are retracted therefrom, whereby to produce a plurality of grooved sealing rings from said sleeve.

8. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, including discretely spaced drive elements on said support means away from said formation, stepping means selectively engaging said drive elements, operator means for said stepping means, and cam means operably engaging said operator means, and cam means including lobe means shaped to actuate said operator means for advancing said support means through said stepping means and said drive elements when said first, second and third cutting means are retracted from said formation, whereby to produce a plurality of grooved sealing rings from said sleeve.

9. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve, each of said cutting means including a cutter element, a carrier for holding said cutter element, and a guide member slidably receiving said carrier to direct reciprocating movements thereof; mounting means adjustably positioning said first and second cutting means on said base means for relative straight line and pivotal types of relocation, including platform means supportably disposed between said guide members and said base means, first guide means directably mounting said platform means for one of said types of relocation relative to said base means, and second guide means directably mounting said guide members for the other of said types of relocation relative to said platform means; third cutting means arranged to execute reversible cutting movements in the direction of said formation for making a sidewall in said sleeve, including a cutter element, a carrier for holding said cutter element, and a guide member slidably receiving said carrier to direct reciprocating movements thereof; mounting means for adjustably positioning said third cutting means on said base means for straight line relocation laterally of said formation; and drive means for causing incremental advance of said support means relative to said base means and for cyclically advancing said first, second and third cutting means whereby to produce a plurality of grooved sealing rings from said sleeve.

10. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, including a drive member affixed to each of said cutting means, reciprocably guided actuator means engaging said drive members, discretely spaced drive elements on said support means away from said formation, stepping means selectively engaging said drive elements, operator means for said stepping means, and cam means operably engaging said actuator means and said operator means, said cam means including lobe means shaped to urge said third cutting means aggressively toward said formation when said first and second cutting means are retracted therefrom and to actuate said operator means for advancing said support means through said stepping means and drive elements when said first, second and third cutting means are retracted from said formation, whereby to produce a plurality of grooved sealing rings from said sleeve.

11. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve, each of said cutting means including a knife, the knives of said first and second cutting means being mounted for movement in individual paths disposed respectively on opposite sides of a plane drawn parallel to the longitudinal axis of said formation whereby said knives cut freely through the material of said sleeve; mounting means adjustably positioning said first and second cutting means on said base means for relative straight line and pivotal types of relocation; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means toward said formation, including discretely spaced drive elements on said support means away from said formation, stepping means selectively engaging said drive elements, operator means for said stepping means, and cam means operably engaging said operator means, said cam means including lobe means shaped to actuate said operator means for advancing said support means through said stepping means and said drive elements when said first, second and third cutting means are retracted from said formation, whereby to produce a plurality of grooved sealing rings from said sleeve.

12. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve, each of said cutting means including a knife, the knives of said first and second cutting means being mounted for movement in individual paths disposed respectively on opposite sides of a plane drawn parallel to the longitudinal axis of said formation whereby said knives cut freely through the material of said sleeve; mounting means adjustably positioning said first and second cutting means on said base means for relative straight line and pivotal types of relocation, including platform means supportably disposed between said first and second cutting means and said base means, first guide means directably mounting said first and second cutting means for the other of said types of relocation relative to said platform means; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means toward said formation, whereby to produce a plurality of grooved sealing rings from said sleeve.

13. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve; mounting means adjustably positioning said first and second cutting means on said base means for relative straight line and pivotal types of relocation, including platform means supportably disposed between said first and second cutting means and said base means, first guide means directably mounting said platform means for one of said types of relocation relative to said base means, and second guide means directably mounting said first and second cutting means for the other of said types of relocation relative to said platform means; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, including a drive member affixed to each of said cutting means, reciprocably guided actuator means engaging said drive members, discretely spaced drive elements on said support means away from said formation, stepping means selectively engaging said drive elements, operator means for said stepping means, and cam means operably engaging said actuator means and said operator means, said cam means including lobe means shaped to urge said third cutting means aggressively toward said formation when said first and second cutting means are retracted therefrom and to actuate said operator means for advancing said support means through said stepping means and drive elements when said first, second and third cutting means are retracted from said formation, whereby to produce a plurality of grooved sealing rings from said sleeve.

14. Apparatus for making rubber sealing rings comprising: support means having a formation adapted to receive a rubber sleeve and to retain the same in position thereon; rotary drive means connected to said support means for rotating the same about the longitudinal axis of said formation; cutter base means aligned radially of said support means adjacent said formation; first and second cutting means arranged to execute reversibly convergible, cutting movements in the direction of said formation for cutting a V groove in said sleeve, each of said cutting means including a knife, the knives of said cutting means being mounted for movement in individual paths disposed respectively on opposite sides of a plane drawn parallel to the longitudinal axis of said formation whereby said knives cut freely through the material of said sleeve; mounting means adjustably positioning said first and second cutting means on said base means for relative straight line and pivotal types of relocation, including platform means supportably disposed between said first and second cutting means and said base means, first guide means directably mounting said platform means for one of said types of relocation relative to said base means, and second guide means directably mounting said first and second cutting means for the other of said types of relocation relative to said platform means; third cutting means arranged to execute reversible, cutting movements in the direction of said formation for making a sidewall cutoff in said sleeve; mounting means for adjustably positioning said third cutting means on said base means for straight line relocation laterally of said formation; and drive means for causing incremental advance of said support means relative to said base means and for cyclically advancing said first, second and third cutting means, including a drive member affixed to each of said cutting means, reciprocably guided actuator means engaging said drive members, discretely spaced drive elements on said support means away from said formation, stepping means selectively engaging said drive elements, operator means for said stepping means, and cam means operably engaging said actuator means and said operator means, said cam means including lobe means shaped to urge said third cutting means aggressively toward said formation when said first and second cutting means are retracted therefrom and to actuate said operator means for advancing said support means through said stepping means and drive elements when said first, second and third cutting means are retracted from said formation, whereby to produce a plurality of grooved sealing rings from said sleeve.

15. Apparatus according to claim 14 wherein said plane is a radial plane intersecting said formation.

References Cited

UNITED STATES PATENTS 1,721,905 7/1929 Hammond et al. _____ 82—100
2,660,243 11/1953 Lomazzo _____ 82—98 X WILLIAM W. DYER, Jr., *Primary Examiner.*

LEONIDAS VLACHOS, *Examiner.*